United States Patent [19]
Parsons

[11] 4,008,959
[45] Feb. 22, 1977

[54] PHOTOGRAPHIC REPROPORTIONING SYSTEM

[75] Inventor: James C. Parsons, Minneapolis, Minn.

[73] Assignee: Combined Services, Incorporated, Minneapolis, Minn.

[22] Filed: June 16, 1975

[21] Appl. No.: 587,037

[52] U.S. Cl. .................................. 355/84; 355/52; 355/99
[51] Int. Cl.² ........................................ G03B 27/10
[58] Field of Search ............... 355/52, 79, 81, 101, 355/103, 121, 125, 126, 84, 81, 50, 51, 99

[56] References Cited
UNITED STATES PATENTS

| | | | |
|---|---|---|---|
| 2,617,337 | 11/1952 | Snyder | 355/103 |
| 3,126,809 | 3/1964 | Adams et al. | 355/99 |
| 3,158,077 | 11/1964 | Miller et al. | 355/103 |
| 3,374,724 | 3/1968 | Lorres | 355/52 X |
| 3,401,616 | 9/1968 | Cross | 355/103 X |
| 3,445,165 | 5/1969 | Dublis | 355/84 |
| 3,767,301 | 10/1973 | Solo | 355/52 |
| 3,861,797 | 1/1975 | Nishada et al. | 355/52 |

*Primary Examiner*—Edna M. O'Connor
*Attorney, Agent, or Firm*—Burd, Braddock & Bartz

[57] ABSTRACT

An apparatus having a first table and a second table carrying a negative and photosensitive film under a member having an elongated slit. A light source projects light through the slit to expose the film as it moves under the slit. Motion transmitting control structure is operable to move the second table at a speed which is equal to or less than the speed of the first table. The motion transmitting structure has an angularly adjustable arm connected to the first table. A movable member located in a guideway is connected by a cable to the second table and engageable with the arm whereby on movement of the first table the arm moves the movable member which in turn moves the second table. The speed of the second table relative to the speed of the first table depends on the angular position of the arm. The apparatus has an accessory for changing a linear image to an arcuate image. This accessory has a disc located in driving engagement with the first table whereby the disc is rotated on movement of the first table. The negative or film is attached to the disc so that it rotates with the disc and moves arcuately relative to the movement of the first table. A second accessory has a member for carrying a negative or film movably mounted on the first table. An arm secured to a support engages a part of the member so that on movement of the first table the member moves with the first table and relative to the first table.

37 Claims, 15 Drawing Figures

PHOTOGRAPHIC REPROPORTIONING SYSTEM

BACKGROUND OF INVENTION

In the graphic art fields, the size of graphic material often must be changed to accommodate specific space requirements. For example, graphic materials used in newspaper advertising must have the size of the newspaper column to provide the most advantageous use of space. The graphic material supplied to the paper does not always conform to the dimensional requirements of the columns of the paper. This graphic material must be changed in size to fit the space requirements of the paper.

In 1916, Lotka disclosed in U.S. Pat. No. 1,176,384 a machine to alter the scale of artwork. The machine has structure which moves the original artwork across a narrow slit cut in an opaque material. A source of light is located above the slit to expose a photographic film located below the artwork. The artwork and film are moved simultaneously past the slit. The image projected on the film can be lengthened or shortened by providing for either faster or slower relative movement between the artwork and photosensitive film. The artwork and film are moved by separate drive structures relative to the light emitting slit.

Adams et al in U.S. Pat. No. 3,126,809 disclose a photographic distortion apparatus which has a slit in a mask or shutter which moves in a manner to cause the slit to progressively traverse the composition during the exposure period while the negative and photosensitive film are moved relative to each other. A similar machine is disclosed by Torres in U.S. Pat. No. 3,374,724. The machine operates to distort the image from a negative and print the distorted image on a photosensitive material by exposing the negative and printed material to a small elongated aperture. The structure having the aperture moves progressively over the negative until the entire negative has been exposed. Separate drive motors move the negative and printing material relative to each other.

Dubbs in U.S. Pat. No. 3,445,165 shows a photographic distortion device that moves the negative and light sensitive film at different rates of speed under an elongated slit operable to expose the light sensitive film. A linkage drive system operates to move the separate mounting structures for the image and film relative to the slit. The linkage system utilizes two angularly disposed rods carrying slide blocks. The relative movement between the separate supports are dependent on the angular positions of the rods.

SUMMARY OF INVENTION

The invention is directed to an apparatus usable to change the size of one dimension of a two-dimension image on a photosensitive medium. The apparatus has first means having a surface for supporting a sheet member having an image or a photosensitive medium, as a film or sheet member. Drive means is operable to move the first means along a path. A member having an elongated slit is located adjacent the surface. A light source positioned above the member provides light which projects through the slit to expose the surface as the surface moves under the slit. Second means located adjacent the first means is movable in the direction of the path of movement of the first means. Motion transmission means operably connects the first means with the second means in a manner so that the second means moves at a speed equal to or less than the speed of the first means. The motion transmission means includes an angularly adjustable speed control arm attached to the first means. The arm engages a movable member guided by a guide means in a direction extended at an angle to the direction of movement of the first means. Means, as a cable, connects the movable member and the second means whereby the second means moves in response to the movement of the first means.

The apparatus is usable with an accessory having a rotatable disc. A part of the outer periphery of the disc engages an edge of the first means so that on movement of the first means the disc rotates. In use, the sheet member having the image or photosensitive film is attached to the disc so that they move in an arcuate path under the slit while the surface of the first means moves in a linear path under the slit.

A second accessory has a member movably mounted on the first means for movement transversely of the movement of the first means. The member has a surface for mounting a sheet member having an image or a photosensitive film. An arm extended at an angle to the direction of movement of the first means is in engagement with part of the member so that the member moves with the first member and relative to the first member, thereby placing the image on the film in an angular or italicized style.

An object of the invention is to provide an apparatus operable to alter one dimension of a two-dimensional graphic representation or image on a light sensitive film without changing the second dimension. A further object of the invention is to provide an apparatus operable to change one dimension of a two-dimensional graphic representation that is simple in construction, easy to operate and maintain, and is adjustable in accordance with a desired predetermined size or change of the graphic representation. A further object of the invention is to provide an apparatus for changing a dimension of a two-dimensional graphic representation on a light sensitive film where the change is constant along the full length of the graphic representation. A still further object of the invention is to provide a photographic reproportioning apparatus that is versatile in use for changing the size and shape of any printed design or motif that can be photographed. Yet another object of the invention is to provide an apparatus that is operable to change a linear graphic representation to an arcuate graphic representation on a light sensitive film. Another object of the invention is to provide an image reproportioning apparatus with adjusting structure that is adjustable according to the size reduction or enlargement desired. A further object of the invention is to provide an apparatus that is operable to stretch a two-dimensional graphic representation in one direction from 100% to 200% or squat the graphic representation from 100% to 50%. These and other objects of the invention are present in the following detailed description of an embodiment of the invention.

DESCRIPTION OF PREFERRED EMBODIMENT

Figure 1:
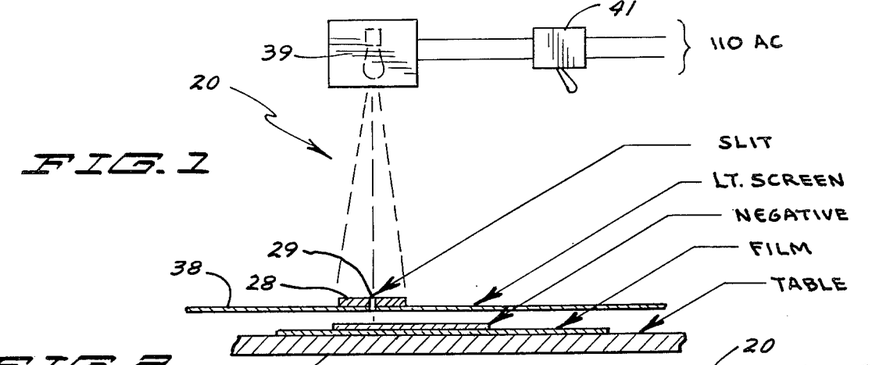
FIG. 1 is an elevational diagrammatic view of the photographic reproportioning system of the invention.
Figure 2:
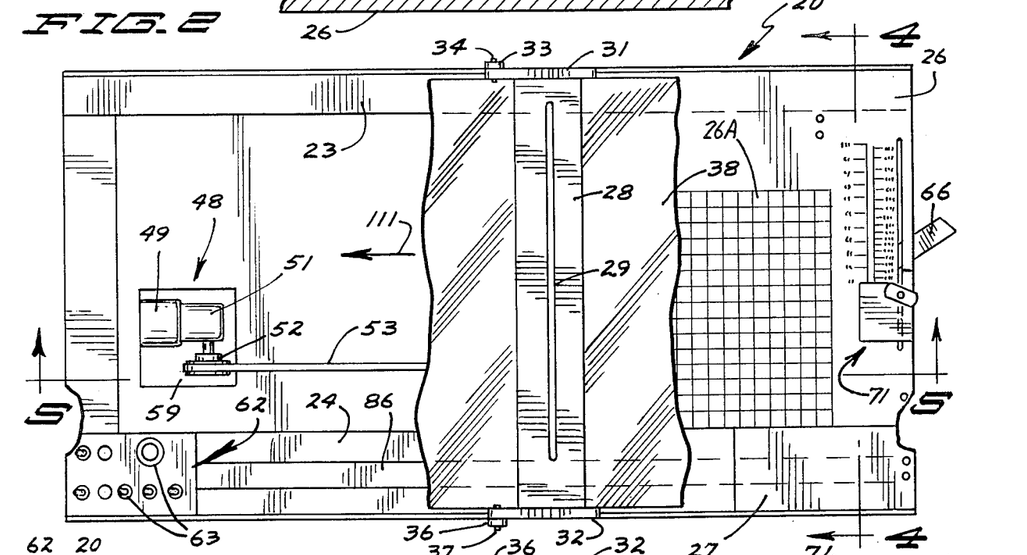
FIG. 2 is a top plan view of the photographic reproportioning apparatus of the invention.
Figure 3:
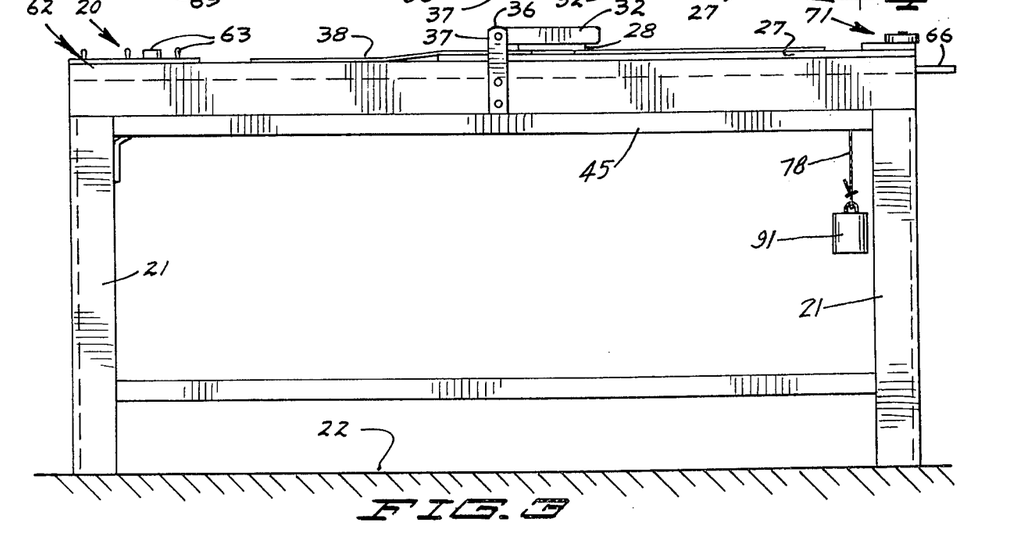
FIG. 3 is a front elevational view of the apparatus of FIG. 2.

Referring to FIGS. 1–3, there is shown the photographic reportioning apparatus of the invention indicated generally at 20 operable to reproportion a two-dimensional image in one dimension without changing the second dimension. Apparatus 20 has a frame, including a plurality of upright legs 21 for supporting the apparatus on support 22, such as the ground or floor. The legs 21 support a flat horizontal stationary member 42 carrying a pair of horizontal tracks 23 and 24. A first horizontal table 26 having a flat top surface is movably mounted on tracks 23 and 24. Rectangular grid lines 26A are incorporated into the top of table 26 to provide guides for aligning the sheet members, as negatives, positive or photosensitive film, on the table. A second horizontal table 27 having a flat top surface is located adjacent one edge of the first table 26. Table 27 is movably mounted on track 24. Tables 26 and 27 move in a linear direction or path along tracks 23 and 24 under a transverse plate member 28. The plate member 28 has an elongated transverse slit or opening 29 allowing light to project downwardly onto the top of table 26. Member 28 is secured to a pair of arms 31 and 32. An upright member 33 secured to side beams 45 has a pivot pin 34 for pivotally connecting arm 31 to member 33. In a similar manner, an upright member 36 secured to side beams 45 accommodates a pivot pin 37 that pivotally connects arm 32 to member 36. The pivot pins 34 and 37 permit plate member 28 to pivot upwardly and thereby expose the portion of table 26 below the slit 29. A flexible light impervious or opaque cover sheet 38 is secured to member 28. Sheet 38 extends from opposite sides of member 28 and covers table 26 to thereby shield the negative and film from the light 39. As shown in FIG. 1, light 39 is located directly above the member 28 when the member 28 is in its closed or down position, as shown in FIGS. 2 and 3. The light 39 is connected with suitable lines to a switch 41. Switch 41 is connected to a conventional 110 AC power source.

Figure 4:
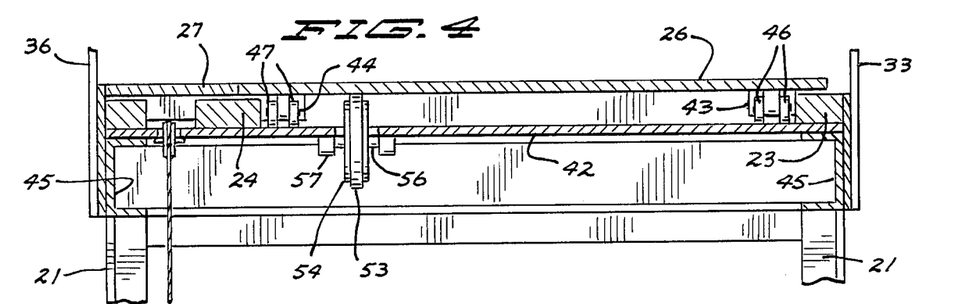
FIG. 4 is an enlarged sectional view taken along line 4—4 of FIG. 2.
Figure 5:
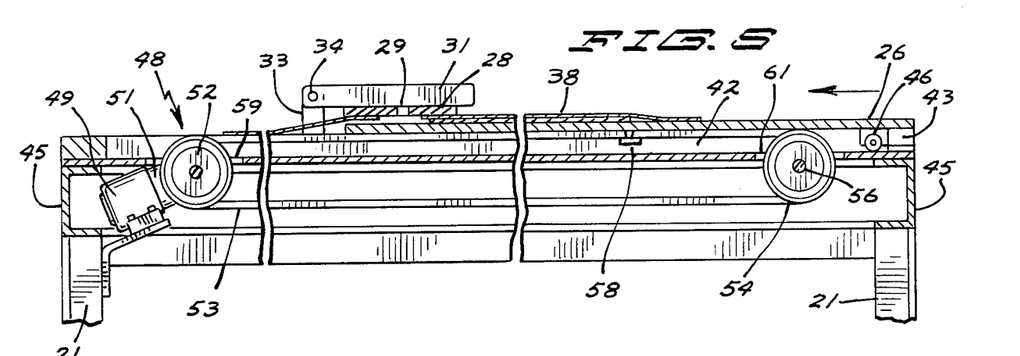
FIG. 5 is an enlarged foreshortened sectional view taken along line 5—5 of FIG. 2.

Referring to FIGS. 4 and 5, a flat stationary support member or base 42 is located below table 26 and supports tracks 23 and 24. The support 42 is secured to the top of side channel beams 45 attached to the top of legs 21. Blocks 43 and 44 are secured to the bottom of table 26. Block 43 has an edge in sliding engagement with the inside edge of the track 23. Block 44 has an outside edge in sliding engagement with the adjacent inside edge of track 24. A pair of wheels 46 are rotatably mounted on block 43 and supported on the support 42. In a similar manner, a pair of wheels 47 are rotatably supported on block 44 and engage the support 42. The wheels 46 and 47 movably support the table 26 for longitudinal movement along tracks 23 and 24. Other types of bearings and sliding supports can be used to insure that the table 26 moves along the tracks 23 and 24.

A drive assembly indicated generally at 48 is used to move the table 26 in a horizontal direction along tracks 23 and 24. Drive assembly 48 comprises an electric motor 49 driving a gear box 51. A drive pulley 52 is connected to the output of gear box 51 and receives an endless belt 53. The belt 53 extends linearly under table 26 and is trained about an idler pulley 54. Pulley 54 is mounted on a shaft 56. Opposite ends of shaft 56 are rotatably mounted in bearings 57 secured to the bottom of support 42. The top run of belt 53 is located under the table 26. A fastener 58, as a bolt, secures belt 53 to the bottom of table 26. As shown in FIG. 5, the drive pulley 52 extends through a hole 59 in support 42. In a similar manner, idler pulley 54 extends through hole 61 in support 42. This permits the upper portions of pulleys 52 and 54 to locate the upper run of the belt adjacent the bottom side of table 26. The belt 53 can have suitable adjusting structure (not shown) to compensate for the elongation or stretching of the belt in use. The motor 49 is an electric motor that is connected with suitable lines to a control panel 62. Control panel 62 has a plurality of control switches 63 used to regulate the speed of motor 49 as well as turn the motor on and off. The switch 41 for light 39 can be incorporated into control panel 62.

Figure 6:
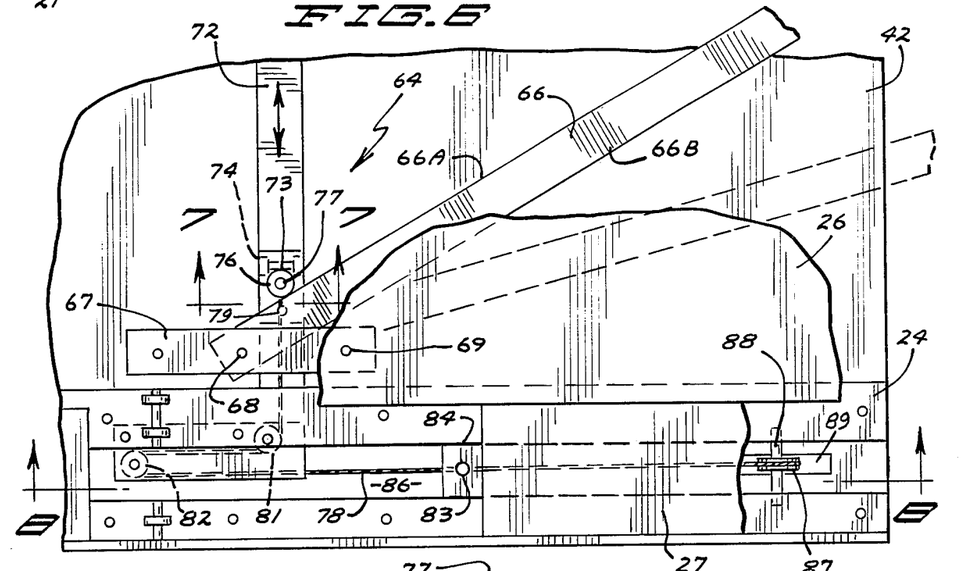
FIG. 6 is an enlarged top plan view, with portions broken away, showing the speed control mechanism of the apparatus of FIG. 2.
Figure 7:
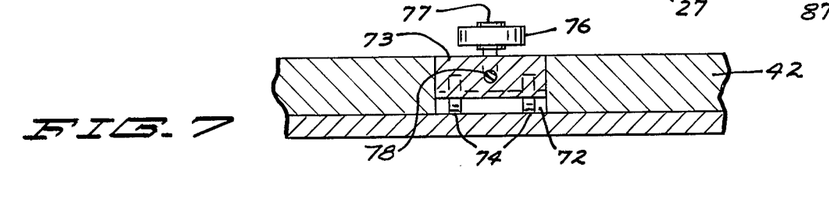
FIG. 7 is an enlarged sectional view taken along line 7—7 of FIG. 6.

Referring to FIGS. 6 and 7, motion transmitting means indicated generally at 64 is operable to transmit the linear movement of table 26 to linear movement of table 27 whereby table 27 moves at a selected speed which can be equal to or less than the linear speed of table 26. The motion transmitting means 64 has a speed control arm 66 located under table 26. A plate 67 carries a pivot pin 68 which connects the arm 66 to plate 67 for movement about a generally upright axis. A plurality of fasteners 69, as bolts, secure the plate 67 to the bottom of table 26. The outer end of arm 66 cooperates with a holding means or clamp assembly indicated generally at 71 in FIGS. 2 and 9 which functions to adjust the angular position of arm 66, thereby adjusting the speed differential between the tables 26 and 27. The details of the clamp assembly 71 are hereinafter described.

Support 42 has a transverse channel or groove 72 accommodating a slide or block 73. A plurality of wheels 74 rotatably mounted on block 73 engage the bottom of the groove 72 to movably support the block 73 in the groove. The opposite sides of block 73 are in close sliding engagement with the side walls of the support 42 forming the groove 72. Additional rollers or bearings can be provided for free movement of block 73 in groove 72. A horizontally disposed roller 76 is located above block 73. Roller 76 is rotatably mounted on an upright axle 77. The lower portion of axle 77 is secured to block 73. Roller 76 rides on the linear edge 66A of arm 66.

Figure 8:
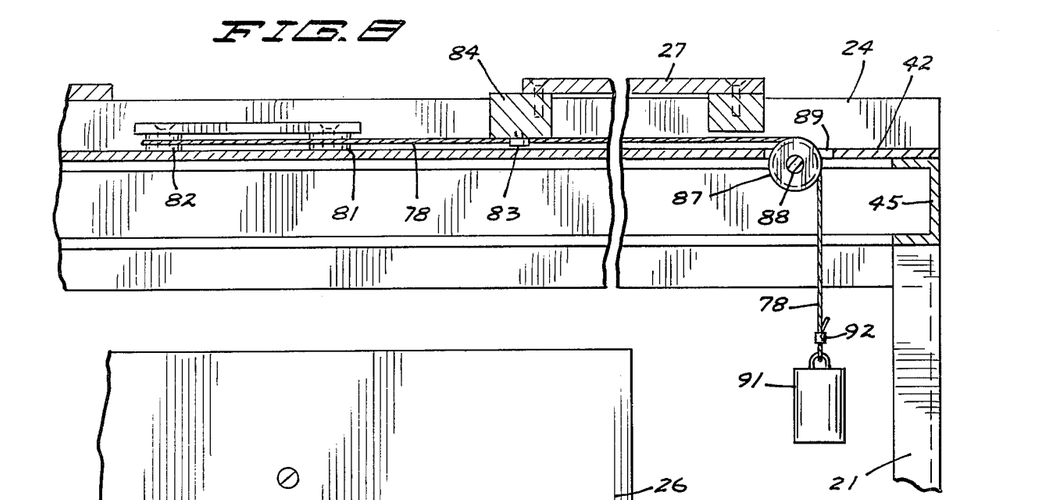
FIG. 8 is an enlarged foreshortened sectional view taken along line 8—8 of FIG. 6.

A flexible cable 78 is secured with a fastener 79, such a bolt, to block 73. The cable 78 extends through a hole in rail 24 and around a first pulley 81 and a second pulley 82. Pulleys 81 and 82 position a portion of the cable 78 in a groove or channel 86 extended linearly along the midportion of the rail 24. As shown in FIG. 8, a fastener 83, as a bolt, connects cable 78 to a block or guide member 84 located in the groove 86. Block 84 is secured to the bottom of the second table 27. The cable 78 extends through block 84 and is trained over a pulley 87. Pulley 87 is mounted on a transverse shaft 88. The shaft 88 is rotatably mounted with bearings (not shown) secured to the bottom side of support 42. Support 42 has a hole 89 accommodating the upper portion of pulley 87 whereby the cable 78 extends downwardly adjacent one leg 21. A weight 91 is secured with a suitable clamp 92 to cable 78 whereby the weight maintains the cable under tension, holds the roller 76 in engagement with arm 66, and moves both tables 26 and 27 back to their initial positions adjacent the right side of the apparatus, as shown in FIG. 2, when the power and holding force of the motor 49 has been terminated.

Figure 9:
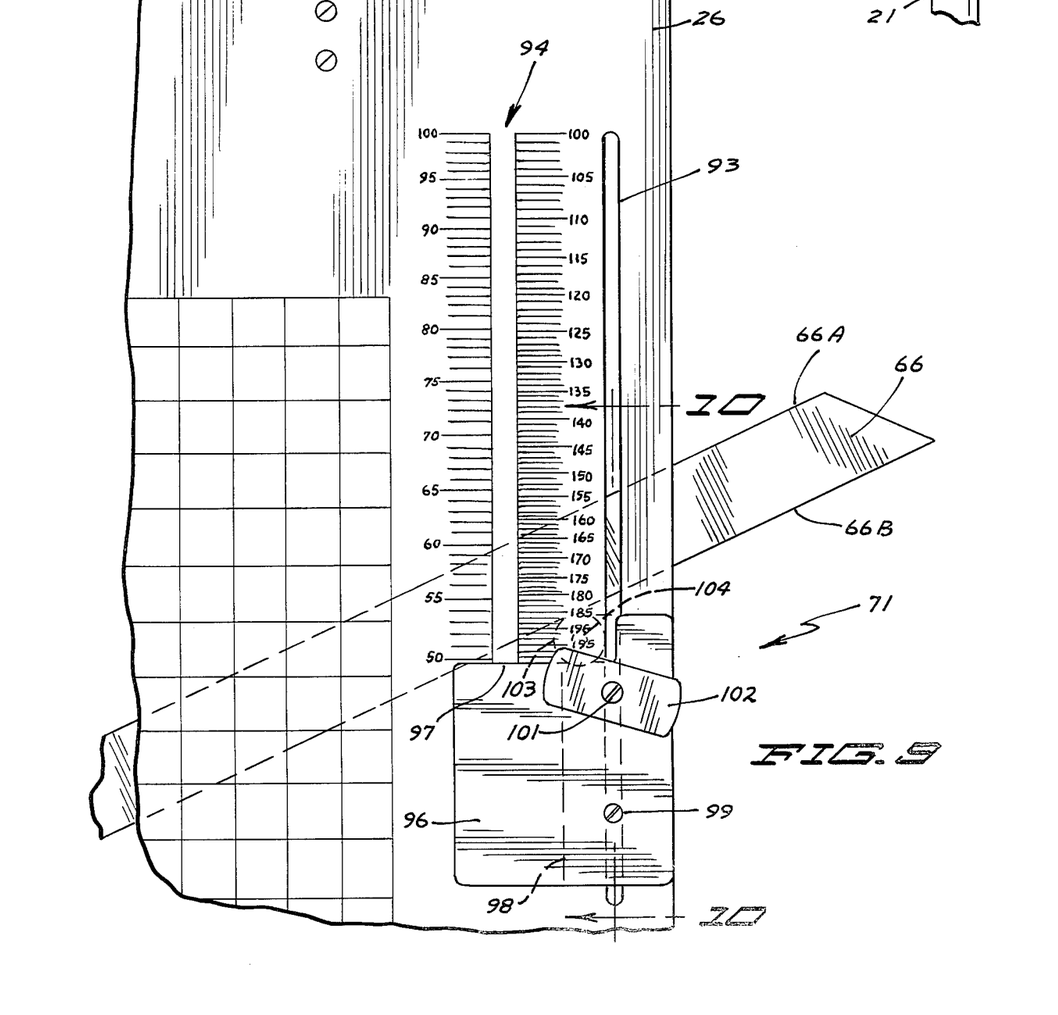
FIG. 9 is an enlarged top plan view of the control arm holding assembly of FIG. 2.
Figure 10:
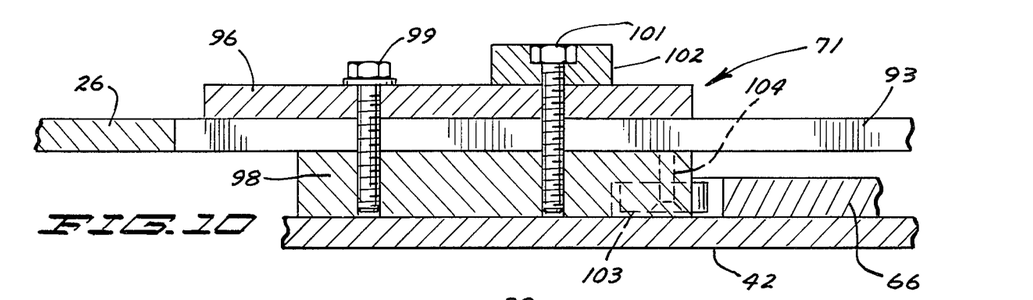
FIG. 10 is an enlarged sectional view taken along line 10—10 of FIG. 9.

Referring to FIGS. 9 and 10, clamp assembly 71 for changing the angular position of the speed control arm 66 is located along the right edge of table 26. Table 26 has an elongated guiding opening or slot 93. A scale 94 graduated in the scale of enlargement or reduction of the image on the photosensitive film is located adjacent slot 93. The left scale is from 50 to 100 and is used in reducing the image on the film. The right scale is from 100 to 200 and is used for expansion of the image on the film. A plate 96 is located on top of table 26. The plate 96 has an edge 97 in alignment with the linear markers of scale 94 whereby the position of the plate 96 relative to table 26 can be selectively located in accordance with the expansion or reduction desired of the image on the film. Located below table 26 is a block 98. A pair of bolts 99 and 101 extend through the slot 93 and are threaded into block 98. Bolt 101 clamps plate 96 and block 98 to opposite sides of table 26 and thereby fixes the position of the plate 96 relative to table 26. Bolt 101 extends through knob 102 located on top of plate 96. The head of bolt 101 is fixed to knob 102 so that rotation of knob 102 will rotate the bolt 101 and thereby release the clamping action of plate 96 and block 98 on table 26. When the knob 102 is turned to its release position, the plate 96 can be moved relative to table 26. The bolts 99 and 101 function as guides in slot 93 to limit movement of plate 96 to linear movement along slot 93. A roller 103 is located adjacent the upper edge of block 98. A bolt 104 carries roller 103 and is secured to a portion of the block 98. Roller 103 is aligned with and engageable with the back edge 66B of arm 66. Accordingly, when plate 96 is moved to a position on table 26 in accordance with a selected location on the scale 94, the angular position of arm 66 will be changed accordingly. Roller 76, being in engagement with the forward side 66A of arm 66, will move in response to the linear movement of the table 26 which also moves the arm 66. The speed of movement of block 73 carrying roller 76 is determined by the angle of arm 66. The steeper the angle, the greater the speed of movement of block 73 in channel 72. Conversely, the smaller the angle, the slower the speed of block 73. Since the cable 78 is secured to block 73, the speed of the second table 27 corresponds to the speed of block 73.

Figure 11:
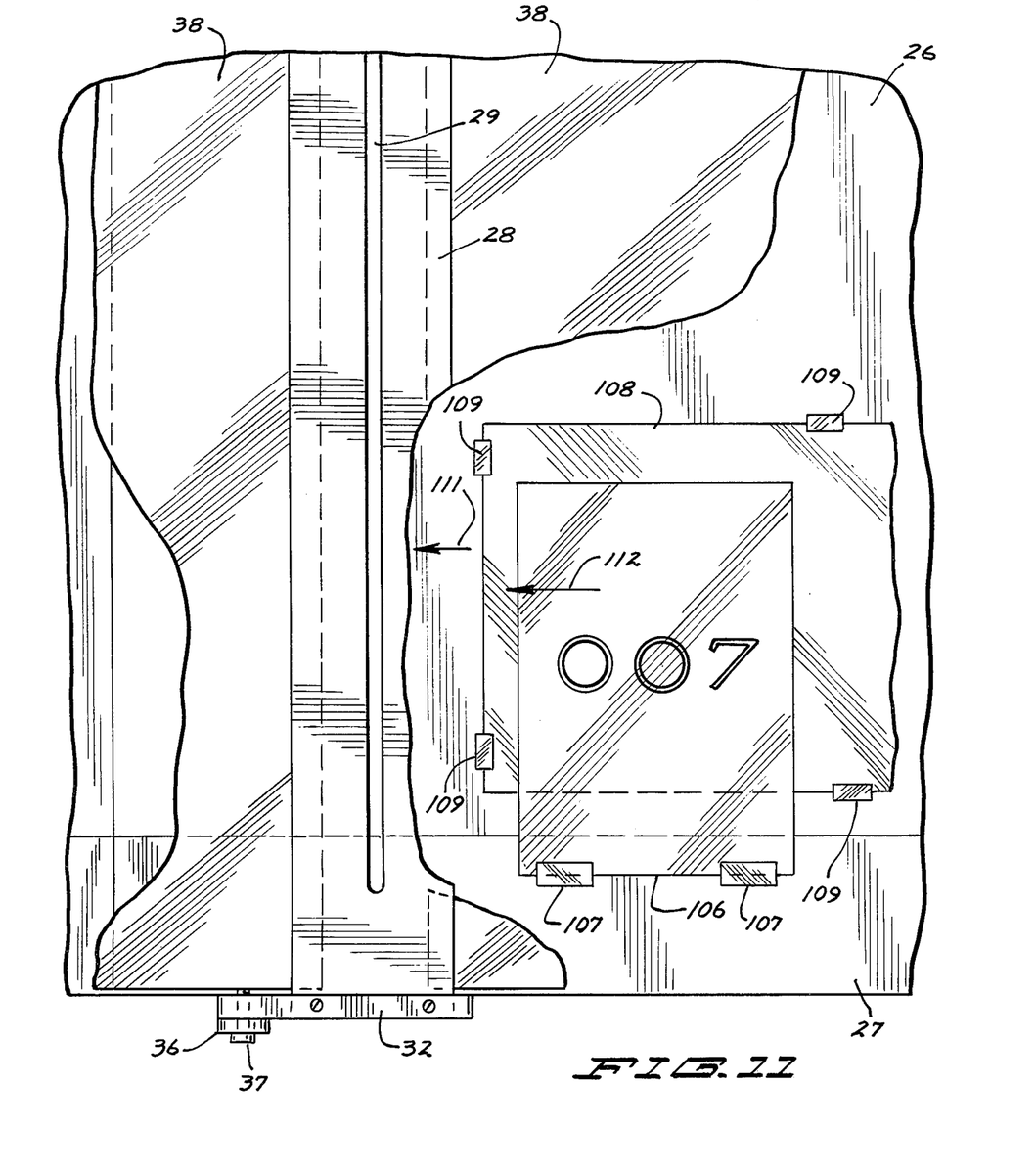
FIG. 11 is an enlarged top plan view of a portion of the apparatus of FIG. 2, with parts broken away, showing the position of the negative and film secured to the first and second movable tables.

In use, the drive assembly 48 functions to move the table 26 along the tracks 23 and 24 in a linear horizontal direction as shown by arrow 111 in FIGS. 2 and 11. The motion transmitting means 64 is operable to transmit the linear movement of table 26 to table 27. The speed of movement of table 27 is at least equal to or slower than the speed of table 26. The ratio of the speed between table 26 and table 27 is determined by the angular position of arm 66. The clamp assembly 71 is used to adjust and hold arm 66 in an adjusted position to provide a desired speed ratio between the tables 26 and 27.

Referring to FIG. 11, a negative 106 having the image "007" is secured to table 27 with fastening means, such as adhesive tape 107. Located below negative 106 is a light sensitive photographic film 108. A plurality of pieces of tape 109 secure the film 108 to the top of table 26. The film will move in the direction of arrow 112 at the same rate of speed as table 27. The film 108 will move at the speed of table 26. The differences in speed between the negative 106 and the film 108 will produce an elongated image on the film 108 as it passes under slit 29. The light from source 39 exposes the film 108.

In order to reduce the size of the image on the film 108, the film is secured to table 27 and the negative 106 is secured to table 26. In this case, the negative 106 will move faster than the film 108, thereby reducing the size of the exposed image on film 108 as the film and negative pass under slit 29. Negative 106 is the image, such as design information, data, graphic representations or artwork, carrying sheet member. This sheet member can have either a positive or negative image. Film 108 is a photographic medium which includes unexposed photosensitive printing paper, plastic films and the like.

Figure 12:
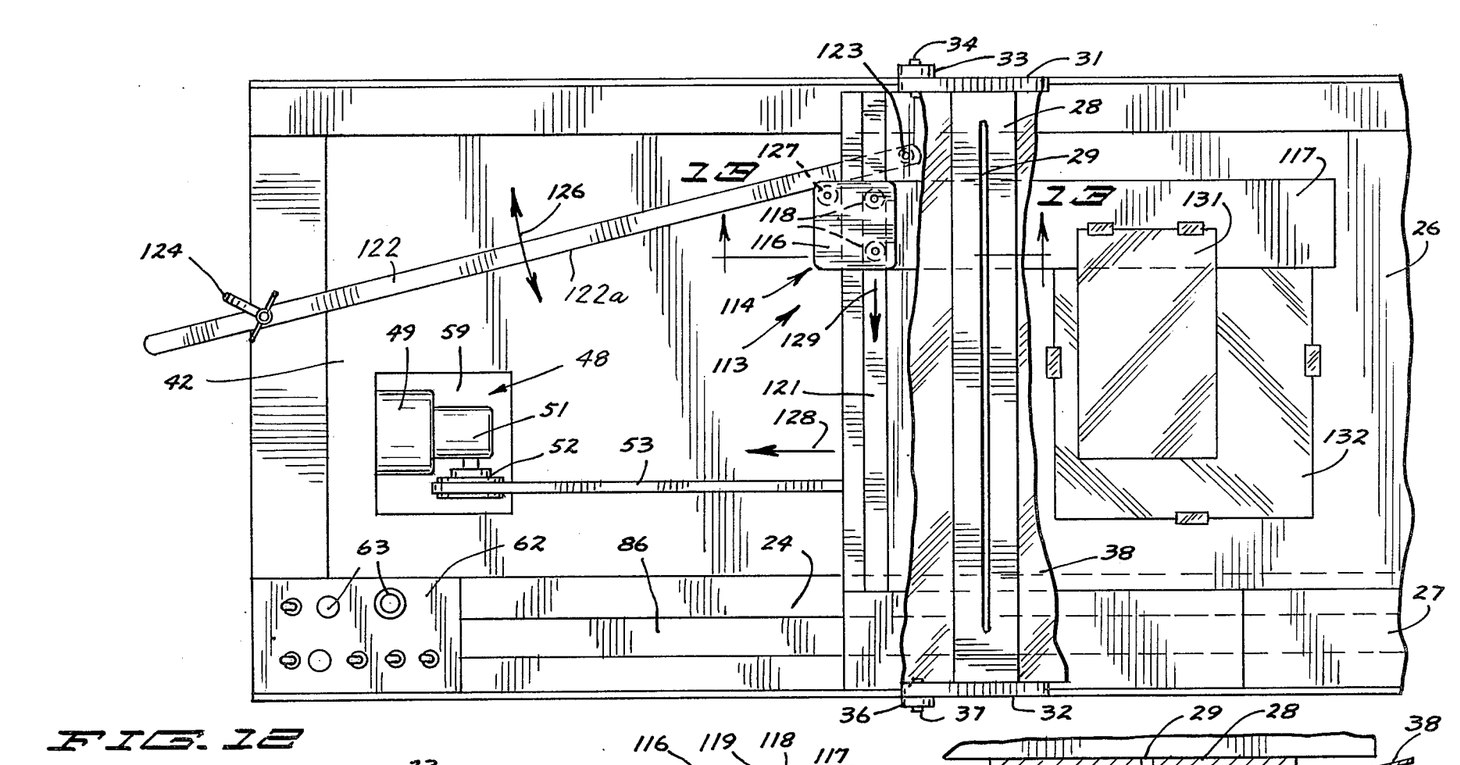
FIG. 12 is a top plan view of the apparatus of FIG. 2, with parts broken away, equipped with an accessory for italicizing the image on the film.
Figure 13:
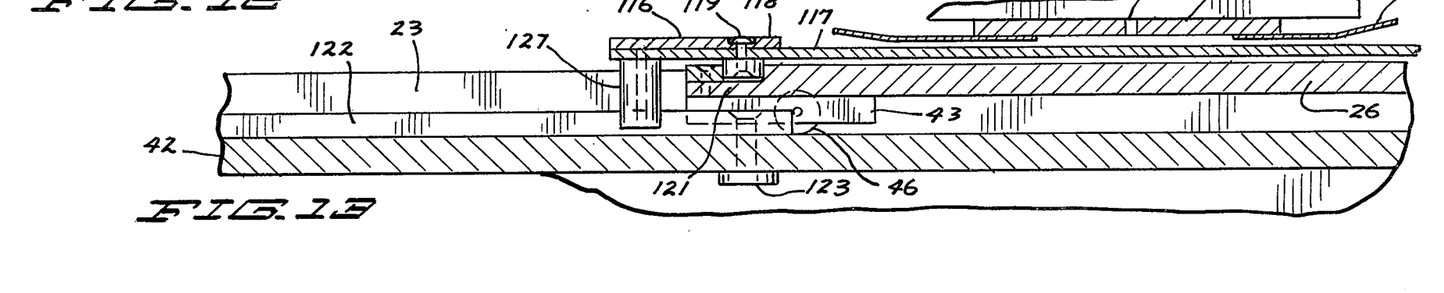
FIG. 13 is an enlarged sectional view taken along line 13—13 of FIG. 12.

Referring to FIGS. 12 and 13, there is shown an accessory indicated generally at 113 for changing the transverse or vertical direction of an image being projected through a negative onto a light sensitive film. Accessory 113 has a holder indicated generally at 114 that moves with table 26 and moves relative to table 26. A holder 114 includes a guide 116 movably mounted on the forward edge of table 26. An elongated longitudinal sheet or flat member 117 is attached to the guide and is located over a portion of table 26. A pair of rollers 114 are located below guide 116. Pins 119 rotatably mount the rollers on the guide 116. The forward edge of table 26 has a transverse groove 121 accommodating rollers 118. Groove 121 forms a track for rollers 118 to guide the holder 114 for transverse movement relative to table 26. An elongated linear arm 122 is located on top of the support 42. A pivot pin 123 connects one end of arm 122 to the support 42, allowing the arm to pivot in a horizontal plane in the direction of arrow 126. The arm 122 is held in its adjusted position with a clamp 124. Clamp 124 releasably secures the arm to base 42. Other types of attaching structure can be used to fix the position of arm 122 relative to base 42.

As shown in FIG. 13, a downwardly projected cylindrical member or follower 127 is secured to the guide 116. The follower 127 can be a cylindrical roller rotatably mounted on a pin or fastener attached to guide 116. The lower end of follower 127 is in engagement with a linear edge 122A of the arm 122. On movement of the table 26 in the forward direction, indicated by arrow 128, on operation of motor 49, the follower 127 in engagement with arm 122 moves the holder 114 inwardly or in the direction of arrow 129. This moves the sheet 117 transversely relative to table 26. A negative 131 containing an image is secured to sheet 117 with tape or suitable fastening means. Located below negative 131 is a photographic film 132 secured to the top of table 26 with tape or like fastening means. On operation of the apparatus, the negative 131 and film 132 will move in the longitudinal direction under slit 29. The negative 131 will also move transversely relative to the film, thereby changing the angle of the image on the film 132. The negative 131 can be secured to table 126 and the film 132 can be secured to sheet 117. In this manner, on operation the image projected on the film 132 will be italicized.

Figure 14:
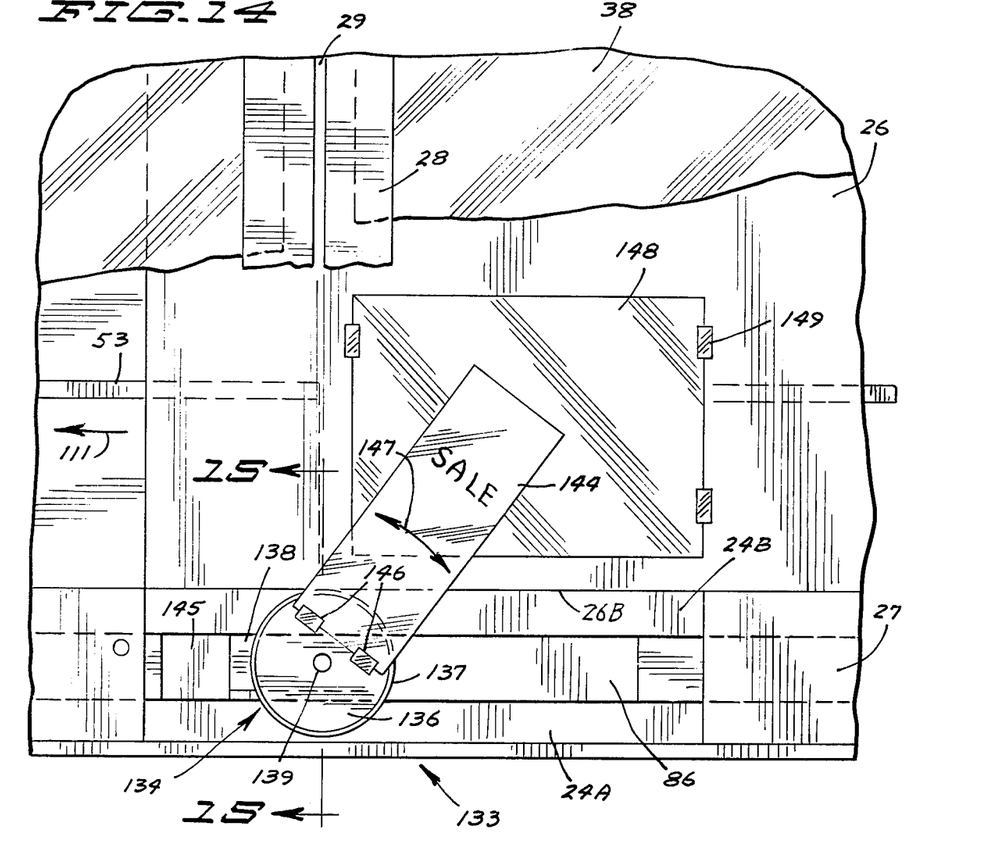
FIG. 14 is a top plan view of a portion of the apparatus of FIG. 2 equipped with an accessory for making an arcuate image on the film.
Figure 15:
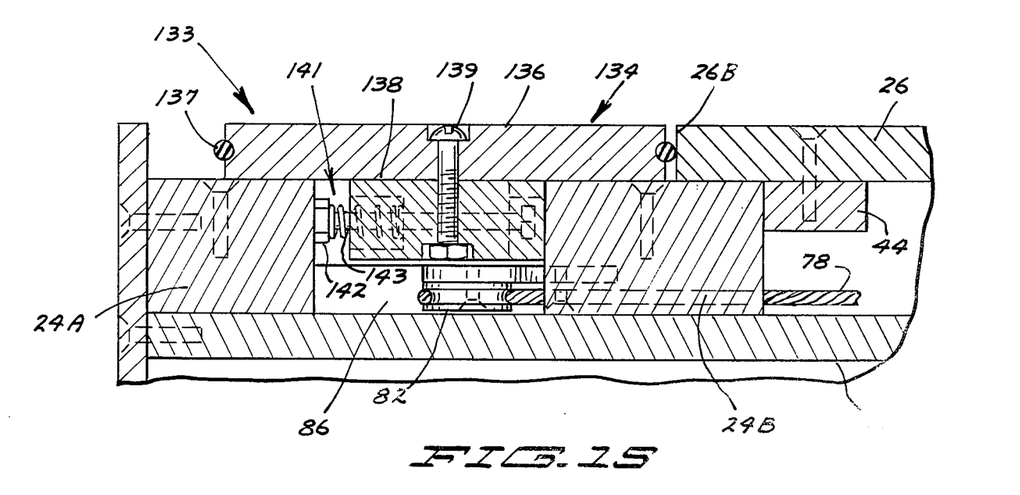
FIG. 15 is an enlarged sectional view taken along line 15—15 of FIG. 14.

Referring to FIGS. 14 and 15, there is shown a second accessory indicated generally at 133 for projecting an arcuate image onto a light sensitive film. Accessory 133 has a holder 134 comprising a disc 136. An annular flexible O-ring 137 is located around the outer periphery of disc 136 and is adapted to engage the linear edge 26B of table 26 whereby movement of table 126 will rotate the disc 136. The block 138 is located below disc 136. As shown in FIG. 15, an upright pivot pin or bolt 139 extends through block 138 and rotatably mounts disc 136 on block 138. Block 139 is held in groove 86 between rails 24A and 24B with a biasing means indicated generally at 141. The biasing means comprises a pair of bolts 142 that extend through suitable holes in the block 138. Springs 143 bias the heads of bolts 142 into engagement with the rail 24A and bias the edge of block 138 into engagement with rail 24B. The springs 143 also hold ring 137 in driving engagement with edge 26A. One of the bolt and spring structures is shown in FIG. 15.

As shown in FIG. 14, negative 144 containing an image is secured to the top of disc 136 with fastening means 146, as tape or the like. The negative 144 moves in an arcuate path indicated by arrow 147 having its axis of rotation along the axis of pivot pin 139. Block 138 is in engagement with a fixed stop member 145 located in channel 86. Pivot pin 139 is located in the same vertical plane as slit 29. A photographic sensitive film 148 is secured to the top of table 26 with fastening means 149, such as tape. Film 148 moves with table 26 in the direction of arrow 111. As the table 26 moves, the disc 36 will be rotated as the ring 37 is in engagement with the table edge 26A. This causes the negative 144 to angularly move relative to the moving film 148. The result is that as the negative and film move under the slit 29, the image projected on the film 148 will have an arcuate pattern.

While there is shown and described an apparatus for reproportioning one dimension of a two-dimension image, it is understood that changes in size, materials and mechanical structures may be made by those skilled in the art without departing from the invention.

The embodiments of the invention in which an exclusive property or privilege is claimed are defined as follows:

1. An apparatus for changing one dimension of a two-dimension image projected on a photosensitive film comprising: a support, a first means having a top surface for carrying a sheet having an image thereon or a photosensitive film, means movably supporting the first means on the support, drive means connected to the first means to move the first means along a linear path, a member having an elongated slit allowing light to project onto the top surface of the first means, a light source operable to project light through said slit, opaque cover means attached to the member for covering said top surface, a second means having a top surface located adjacent one side of the first means for carrying a sheet having an image thereon or a photosensitive film, means movably supporting the second means on the support for movement in the same direction as the linear path of the first means, motion transmitting means operably connected to the first means and second means operable to move the second means in response to movement of the first means at a speed equal to or less than the speed of the first means, said motion transmitting means having an arm having a linear edge, pivot means connecting the arm to the first means whereby the arm moves with the first means, holding means for limiting pivotal movement of the arm relative to the first means, a movable member having a portion engageable with the edge of the arm, track means on said support for guiding the movable member along a path extended in a direction at an angle to the linear path of movement of the first means, and means connecting the movable member with the second means whereby on movement of the first means by operation of the drive means the arm moves the movable member along the track means at a speed dependent on the angle of the arm relative to the linear path of the first means, said second means being moved by the movable member at the same speed as the movable member, the speed being equal to or less than the speed of the first means.

2. The apparatus of claim 1 wherein: the means movably supporting the first means on the support includes linear track means for guiding the first means along its linear path.

3. The apparatus of claim 1 wherein: the drive means includes a motor, and belt means drivably connected to the motor, and means connecting the belt means to the first means whereby on operation of said motor the belt means moves the first means along its linear path.

4. The apparatus of claim 1 including: means pivotally mounting the member having an elongated slit on said support.

5. The apparatus of claim 1 wherein: the means movably supporting the second means on the support includes track means extended in the direction of the linear path of movement of the first means.

6. The apparatus of claim 1 wherein: the portion of the movable member includes a roller engageable with the edge of the arm.

7. The apparatus of claim 1 wherein: the track means is a groove in the support, said movable member being located in said groove, said portion of the movable member projected upwardly and in engagement with the edge of the arm.

8. The apparatus of claim 1 wherein: the holding means is mounted on the first means.

9. The apparatus of claim 1 wherein: the holding means includes a clamp operatively connected to the first means at selected positions, said clamp having edge means providing a visual line, said first means having indicia alignable with said edge means providing dimension change information of the image to be reproduced on the photosensitive film.

10. The apparatus of claim 1 wherein: the means connecting the movable member with the second means is a flexible cable.

11. Control structure for an apparatus usable to change one dimension of a two-dimension image on a photosensitive film, said apparatus having a member with an elongated slit, a light source above the member to project light through the slit, first means movable under the member for supporting either a sheet containing the image or a photosensitive film, and a second means located adjacent the first means for supporting either a sheet having an image or a photosensitive film, said second means being movable in the same direction as the first means comprising: drive means connected to said first means to move the first means relative to the member whereby the first means moves relative to the member to progressively project light on the first means, motion transmitting means connected to the first means and second means operable to move the second means in response to movement of the first means, said motion transmitting means including an arm, means movably connecting the arm to the first means, holding means for limiting movement of the arm relative to the first means, a movable member having a portion engageable with the arm, guide means for guiding the movable member in a direction extended at an angle to the direction of movement of the first means, and means connecting the movable member with the second means whereby on movement of the first means by operation of the drive means the arm moves the movable member, said movement of the movable member being transmitted to the second means through the means connecting the movable member with the second means.

12. The control structure of claim 11 wherein: the drive means includes a motor, belt means drivably connected to the motor, and means connecting the belt means to the first means whereby on operation of the motor the belt means moves the first means.

13. The control structure of claim 11 wherein: the holding means is mounted on the first means.

14. The control structure of claim 11 wherein: the holding means includes a clamp operatively connected to the first means at a selected position, said clamp being movable relative to the first means to thereby change the angle of the arm, said clamp having edge means, said first means having indicia alignable with the edge means providing dimension change information of the image to be reproduced on the photosensitive film.

15. The control structure of claim 11 wherein: the apparatus has a stationary member, said guide means comprising a groove in the stationary member, said movable member being located in said groove.

16. The control structure of claim 11 wherein: said portion of the movable member comprises a roller engageable with the arm.

17. An apparatus for moving a first member and a second member along a linear path comprising: a support, the first member movably supported on the support for movement along a linear path, a second member located adjacent the first member movably supported on the support for movement along the linear path, drive means connected to the first member to move the first member along said linear path, motion transmitting means operably connected to the first member and second member operable to move the second member in response to movement of the first member at a speed equal to or less than the speed of the first member, said motion transmitting means having an arm, said arm having a linear edge, means movably mounting the arm to the first member whereby the arm moves with the first member along the linear path, holding means for limiting movement of the arm relative to the first member, a movable member having a portion engageable with the edge of the arm, guide means on the support for guiding the movable member along a path extended in a direction at an angle to the linear path of movement of the first member, and means connecting the movable member with the second member whereby on movement of the first member by operation of the drive means, the arm moves the movable member along the guide means at a speed dependent on the angle of the arm relative to the linear path of the first member, said second member being moved by the movable member at the same speed as the movable member, said speed being equal to or less than the speed of the first member.

18. The apparatus of claim 17 wherein: the drive means includes a motor, a belt means drivably connected to the motor, and means connecting the belt means to the first means whereby on operation of said motor the belt means moves the first means along its linear path.

19. The apparatus of claim 17 including: means having an elongated slit allowing light to project on the first member, and means pivotally mounting the means having an elongated slit on the support.

20. The apparatus of claim 17 wherein: the portion of the movable member includes a roller engageable with the edge of the arm.

21. The apparatus of claim 17 wherein: the holding means is mounted on the first means.

22. The apparatus of claim 17 wherein: the holding means includes a clamp operatively connected to the first means at selected positions, said clamp having edge means providing a visual line, said first means having indicia alignable with said edge means providing dimension change information of the image to be reproduced on the photosensitive film.

23. The apparatus of claim 17 wherein: the means connecting the movable member with the second means is a flexible cable.

24. An apparatus for transferring an image on a sheet member to a photosensitive film comprising: a support, first means movably mounted on the support, said first means having a first surface for carrying the sheet member having the image or the photosensitive film and an edge, drive means for moving the first means on the support, means having an elongated slit located adjacent said first surface, said slit allowing light to project onto said first surface, second means having a second surface for holding the sheet member having the image or the photosensitive film and locating said sheet member or film in superimposed relation with the sheet member or film carried by the first means, said second means including a rotatable disc having said second surface and an outer peripheral edge located in driving engagement with the edge of the first means whereby on movement of the first means the disc rotates, moving the sheet member having the image or photosensitive film held on the second surface in an arcuate path, means mounting the disc on the support, and stop means on the support operable to position the second means in a location wherein the axis of rotation of the disc is located in longitudinal alignment with the longitudinal length of the slit.

25. The apparatus of claim 24 wherein: the support has a groove and the means mounting the disc includes means located in the groove to releasably mount the second means on the support.

26. The apparatus of claim 25 wherein: the means located in the groove includes a block, means to bias the block into engagement with the support and means to rotatably mount the disc on the block.

27. The apparatus of claim 24 including: a continuous resilient member surrounding the outer peripheral edge of the disc means and located in driving engagement with the edge of the first means.

28. An apparatus for transferring an image on a sheet member to a photosensitive film comprising: a support, first means movably mounted on the support, said first means having a surface for carrying the sheet member having the image or the photosensitive film, said support having guide means cooperating with the first means for guiding the first means for movement in a first direction, drive means for moving the first means on the support for movement in said first direction, means having an elongated slit located adjacent the top of said surface, said slit allowing light to project onto said surface, second means movably mounted on the first means for movement in a second direction, said second means having means for holding the sheet member having the image or the photosensitive film and locating said sheet member or film in superimposed relation with the sheet member or film carried by the first means, said first means having an elongated groove extended in said second direction, means mounted on the second means and located in said groove to guide the second means in the second direction, arm means attached to said support, said arm means having an edge extended at an angle relative to the first direction, and means mounted on the second means engageable with said edge whereby on movement of the first means the second means moves with the first means and moves in the second direction.

29. The apparatus of claim 29 wherein: said means located in the groove to guide the second means along the groove comprise a pair of rollers rotatably connected to the second means.

30. The apparatus of claim 29 including: pivot means connecting the arm means to the support, and fastening means holding the arm means in an adjusted angular position on the support.

31. The apparatus of claim 29 wherein: the means for holding the sheet member of the second means is a flat sheet located on top of the surface of the first means.

32. An apparatus for changing one dimension of a two-dimension image projected on a photosensitive film comprising: a support, first means having a top surface for carrying a sheet having an image thereon or a photosensitive film, means movably supporting the first means on the support for movement along a first linear path, drive means connected to the first means to move the first means along said linear path, a member having an elongated slit allowing light to project on the top surface of the first means, means for covering said top surface to shield the surface from outside light, second means having a top surface located adjacent one side of the first means for carrying a sheet having an image thereon or a photosensitive film, means movably supporting the second means on the support for movement in a second linear path parallel to the first linear path and motion transmitting means operably connected to the first means and the second means operable to move the second means in response to movement of the first means at a speed equal to or less than the speed of the first means, said motion transmitting means having an arm connected to the first means whereby the arm moves with the first means, and means engageable with the arm and connected to the second means whereby on movement of the arm the second means moves with the first means at a speed dependent on the angle of the arm relative to the first linear path.

33. The apparatus of claim 32 including: pivot means connecting the arm to the first means, and holding means for limiting the pivotal movement of the arm relative to the first means.

34. The apparatus of claim 32 wherein: the means engageable with the arm and connected to the second means includes a movable member having a portion engageable with the arm, track means on the support for guiding the movable member along a path extended in a direction at an angle to the first linear path, and means connecting the movable member with the second means.

35. The apparatus of claim 34 wherein: said support has a groove, said movable member being located in said groove to guide the movement of the movable member relative to the support.

36. The apparatus of claim 32 wherein: the means engageable with the arm and connected to the second means includes a movable member and a flexible cable connected to the movable member and the second means.

37. The apparatus of claim 32 including: pivot means connecting the arm to the first means, holding means for limiting the pivotal movement of the arm relative to the first means, said holding means including a clamp operatively connected to the first means at selected positions, said clamp having means providing a visual line, said first means having indicia alignable with the means providing a visual line to provide dimensional change information of the image to be reproduced on the photosensitive film.

* * * * *

UNITED STATES PATENT AND TRADEMARK OFFICE
CERTIFICATE OF CORRECTION

PATENT NO. : 4,008,959
DATED : February 22, 1977
INVENTOR(S) : James C. Parsons

It is certified that error appears in the above—identified patent and that said Letters Patent are hereby corrected as shown below:

Column 1, line 40, "printing material" should be --structure having the aperture--.

Column 11, Claim 29, line 1, "29" (second occurrence) should be --28--.

Column 11, Claim 30, line 1, "29" should be --28--.

Column 11, Claim 31, line 1, "29" should be --28--.

Signed and Sealed this second Day of August 1977

[SEAL]

Attest:

RUTH C. MASON
Attesting Officer

C. MARSHALL DANN
Commissioner of Patents and Trademarks